United States Patent [19]

Nanjo et al.

[11] 4,299,947
[45] Nov. 10, 1981

[54] PROCESS FOR PRODUCING QUICK-CURING PHENOLIC RESIN

[75] Inventors: Motoyuki Nanjo, Yokohama; Tsutomu Watanabe, Utsunomiya; Shigeru Koshibe, Toride; Keiji Azuma, Matsudo, all of Japan

[73] Assignee: Sumitomo Bakelite Company Limited, Tokyo, Japan

[21] Appl. No.: 158,559

[22] Filed: Jun. 11, 1980

[51] Int. Cl.$^3$ ............................................. C08G 8/10
[52] U.S. Cl. .................................... 528/139; 528/140; 528/144
[58] Field of Search ........................ 528/139, 140, 144

[56] References Cited

U.S. PATENT DOCUMENTS

| | | | |
|---|---|---|---|
| 2,464,207 | 3/1949 | Bender et al. | 528/137 X |
| 2,475,587 | 7/1949 | Bender et al. | 528/139 X |
| 3,422,068 | 1/1969 | Kreibich et al. | 528/139 X |
| 3,476,707 | 11/1969 | Culbertson et al. | 528/140 X |
| 4,097,463 | 6/1978 | Culbertson | 528/140 X |
| 4,113,700 | 9/1978 | Culbertson | 528/139 X |

OTHER PUBLICATIONS

Modern Plastics, Feb. 1953, pp. 136, 138, 220, 222, Bender.
Modern Plastics, Mar. 1954, pp. 115-116, 118 & 200, Bender.

*Primary Examiner*—Howard E. Schain

[57] ABSTRACT

A high-ortho phenolic novolac resin having excellent curability, heat stability and flowability can be produced safely at low cost by a process which comprises reacting a phenol and an aldehyde at a temperature of more than 100° C. with (A) a catalyst effective for the addition reaction selected from the salts of divalent metals in combination with (B) a catalyst effective for the condensation reaction, or comprises reacting a phenol and an aldehyde under reflux in the presence of the catalyst (A), adding an acid to adjust the pH to 1–5, removing water under reduced pressure and then subjecting the product to reaction at a temperature of more than 100° C. This process enables the addition reaction and the condensation reaction to proceed with a good balance, can solve problems arising in the prior process such as gelation, low yield and the like, and can produce a high-ortho type phenolic novolac resin safely at low cost. Accordingly, this process is quite advantageous in industry.

6 Claims, No Drawings

PROCESS FOR PRODUCING QUICK-CURING PHENOLIC RESIN

This invention relates to an industrial process for producing quick-curing phenolic resins. The characteristic feature of this invention consists in producing a high-ortho phenolic resin safely, easily and at low cost by use of an appropriate combination of a divalent metal salt effective for the addition reaction and a divalent metal salt or an acid effective for the condensation reaction.

Since H. L. Bender et al. reported that a high-ortho phenolic novolac resin having a high ortho linkage content has a quick-curing property, a variety of production processes have been proposed for this high-ortho phenolic novolac resin.

High-ortho phenolic novolac resins are usually produced by first producing a methylol-phenol form with a weakly acidic divalent metal salt as a catalyst, followed by condensing the same. In this case, if the reaction is carried out with only one kind of weakly acidic divalent metal salt catalyst, it is difficult to keep a good balance between the reaction velocities of addition reaction (methylolation) and condensation reaction (methylene formation) during the progress of the reactions, so that there arise problems such that the reaction system forms a gel, that only a phenolic resin having a small ortho/-para linkage ratio is produced, and the like.

The present inventors have studied in detail the role of divalent metal salt and the reaction mechanism in the production of a high-ortho phenolic resin, and established an industrial production process of a high-ortho phenolic resin. It has been revealed by the studies that the formation of a phenolic resin having a high ortho/-para linkage ratio (hereinafter referred to as o/p ratio) by use of a divalent metal salt is only enabled by forming the ortho-methylol product by a reflux reaction and then condensing the ortho-methylol product at a temperature of more than 100° C., at which the para-selectivity of the reaction is weakened, and that, if the condensation is carried out at a temperature of not more than 100° C., the condensation proceeds preferentially at the para-position even in the presence of a divalent metal salt, so that only a phenolic resin having a small o/p ratio is obtained. Further, it has also been found that the dissociation constant and solubility of the divalent metal salt determines the selectivity of the addition-condensation reaction, namely that a divalent metal salt having a high dissociation constant and a high solubility is effective for the condensation reaction (methylene formation) while a divalent metal salt having a low dissociation constant and a low solubility is effective for the addition reaction (methylolation).

The present inventors have found that when catalysts different in action are used in an appropriate combination and the condensation reaction is carried out at a temperature of more than 100° C., both addition reaction and condensation reaction proceed with a good balance, whereby a high-ortho type of quick-curing phenolic resin can be produced safely, easily and inexpensively.

According to this invention, there is provided a process for producing a quick-curing phenolic resin having an o/p ratio of 0.9-3.0 and a number average molecular weight of the resin exclusive of free phenol of 600-1,100, which comprises reacting a phenol (P) and formaldehyde (F) in a F/P molar ratio of 0.6-0.95 at a temperature of more than 100° C. with a combination of (A) a catalyst effective for the addition reaction selected from divalent metal salts and (B) a catalyst effective for the condensation reaction selected from divalent metal salts, said combination being used from the start of the reaction, or comprises subjecting said phenol and formaldehyde to a reaction under reflux in the presence of the (A) catalyst only to form an ortho-methylol-phenol product, adding an acid to the system until the pH becomes 1-5 which is a value effective for the condensation reaction, immediately thereafter removing water under reduced pressure, and then subjecting the product to a further reaction at normal pressure at a temperature of more than 100° C. It is particularly effective to use one or more salts of alkaline earth metals or transition metals with organic monocarboxylic acids as the (A) catalyst and one or more salts of alkaline earth metals or transition metals with inorganic acids as the (B) catalyst. The term "transition metals" used herein means metals selected from the first and second transition elements having an atomic numbers of 21-30 and 39-48 in the Periodic Table. As said acid, it is effective to select one or more acids having an optimum solubility and dissociation constant for obtaining the desired pH value. When a pH value of, for example, about 4 is desired, it is preferable to use not a slight quantity of hydrochloric acid but a large amount of salicylic acid.

The molar ratio of the catalyst (A) to the catalyst (B), when used in combination, is 0.02-4. When it is less than 0.02, the yield is extremely low. When it is more than 4, there is a danger of gelation. The amount of the divalent metal salt used is 0.1-3% by weight based on the weight of phenol charged. That is, when the catalysts (A) and (B) are used in combination the the total amount of both catalysts is 0.1-3% by weight based on the weight of phenol charged, while when the catalyst (A) and an acid are used in combination the amount of the catalyst (A) is 0.1-3% by weight based on the weight of phenol charged. When the amount of the divalent metal salt is less than 0.1% by weight, the yield is extremely low. When it is more than 3% by weight, the salt content in the phenolic resin becomes not negligible and may adversely affect the electrical properties.

When the catalyst (A) and an acid are used in combination, it is desired that the consumption of formaldehyde is 50-95% by weight and the consumption of the phenol be 30-75% by weight, at the time of completing the reflux. If the consumptions are too small, a low molecular weight resol is mainly formed, so that the subsequent reaction is difficult to control and there is a possibility of gelation. If the consumptions are too great, the condensation reaction progresses excessively, and the phenolic resin obtained has a relatively low o/p ratio.

When the catalyst (A) and an acid are used in combination, it is desired that the dehydration under reduced pressure after addition of the acid be effected until the water content of the reaction system becomes 5% by weight or less. In the step of dehydration under reduced pressure after addition of acid, it is desirable to make the water content of the system not more than 5% by weight in order to suppress the generation of heat due to addition of acid, to make the reaction system approach a non-aqueous state, to accelerate the subsequent condensation reaction and to facilitate the temperature control in the condensation reaction. When it is more than 5% by weight, the condensation temperature is kept at a low level owing to the heat of vaporization of water, so that only a phenolic resin having a low o/p ratio is obtained.

As the formaldehyde source, it is preferable to use paraformaldehyde having a low water content when the catalysts (A) and (B) are used in combination and to use formalin having a high water content when the catalyst (A) and the acid are used in combination. When the catalysts (A) and (B) are used in combination, the low water content, namely, the use of paraformaldehyde, is preferable for securing a temperature of more than 100° at normal pressure. On the other hand, superatmospheric pressure is required to secure a temperature of more than 100° C. when formalin is used. When the catalyst (A) and the acid are used in combination, the use of formalin having a high water content is preferable for controlling the addition reaction, absorbing the heat generated at the time of adding the acid and dispersing the reaction system uniformly. When paraformaldehyde is used in said case, the reaction is difficult to control.

The phenolic resin obtained according to this invention has an o/p ratio of 0.9–3.0 and a number average molecular weight of the resin exclusive of free phenol of 600–1,100. The desired o/p ratio can be obtained by varying the ratio of the catalyst (A) to the catalyst (B) or by adjusting the pH value after addition of acid, and the desired molecular weight can be obtained by varying the F/P molar ratio at the time of charge. That is, by this invention, resins having an o/p ratio and a molecular weight falling in the above-mentioned ranges can freely be obtained safely, easily and inexpensively.

From the phenolic resin obtained by this invention, there can be obtained molding materials having various curability and flowability. Particularly, a molding material formed from a phenolic resin having an o/p ratio of 1.0–1.5 and a number average molecular weight of the resin exclusive of free phenol of 700–900 exhibits the features that it has a good heat-stability, a good flowability and a quick-curing property and enables the shortening the molding time in a large scale molding, whereby high cycle molding is made possible. Further, owing to its excellent flowability and melting property, addition of plasticizer becomes unnecessary, so that problems such as dulling of mold, bad appearance of molded product and the like can be eliminated.

This invention is explained below referring to Examples and Comparative Examples. The Examples are by way of illustration and not by way of limitation.

In the following Examples and Comparative Examples, the curability, the o/p ratio, the number average molecular weight and the Barcol hardness were determined in the following manner.

(1) Curability
 Instrument used: Curelastometer as disclosed in U.S. Pat. No. 3,479,858 and British Pat. No. 1,126,995.
 Measuring Conditions
 Die temperature: 150° C.
 Molding pressure: 100 kg/cm²
 Angle of oscillation: 0.5°

(2) o/p ratio

The amount of the protons of ortho-methylol, para-methylol, ortho-ortho bonded methylene, ortho-para bonded methylene and para-para bonded methylene was measured by means of a nuclear magnetic resonance spectrometry (NMR), from which the ortho linkage/para linkage ratio was calculated from the following equation:

$$\text{o/p ratio} = \frac{\left(\begin{array}{c}\frac{1}{2}\text{ ortho-}\\\text{methylol}\\\text{methylene}\\\text{protons}\end{array}\right) + \left(\begin{array}{c}\text{ortho-ortho}\\\text{linkage}\\\text{methylene}\\\text{protons}\end{array}\right) + \left(\begin{array}{c}\frac{1}{2}\text{ ortho-para}\\\text{linkage}\\\text{methylene}\\\text{protons}\end{array}\right)}{\left(\begin{array}{c}\frac{1}{2}\text{ para-}\\\text{methylol}\\\text{methylene}\\\text{protons}\end{array}\right) + \left(\begin{array}{c}\text{para-para}\\\text{linkage}\\\text{methylene}\\\text{protons}\end{array}\right) + \left(\begin{array}{c}\frac{1}{2}\text{ ortho-para}\\\text{linkage}\\\text{methylene}\\\text{protons}\end{array}\right)}$$

(3) Number average molecular weight

It was measured by a vapor pressure equilibrium method. The number average molecular weight of the resin exclusive of free phenols was calculated from the measured value of number average molecular weight and the amount of free phenols determined by gas chromatography.

(4) Barcol hardness
 Apparatus: Barcol Impresser 935
 Curing conditions: 175° C., 20 seconds
 Time of measurement: 10 seconds after taking the sample out of the mold.

EXAMPLE 1

To reaction under reflux were subjected 282 g of phenol and 87 g of 88% by weight paraformaldehyde (F/P=0.85) for 3 hours in the presence of 1.96 g of zinc chloride and 0.11 g of barium acetate. (The inner temperature of the reaction vessel changed from 115° C. to 105° C.) Subsequently, the reaction mixture was dehydrated by heating at normal pressure and taken out onto a vat when the inner temperature had reached 150° C. Thus, 285 g of a resin having an o/p ratio of 1.1, a number average molecular weight of the resin exclusive of free phenol of 805 and a free phenol content of 7.0% by weight was obtained. To 100 parts by weight of this resin was added 15 parts by weight of hexamethylenetetramine, and the gel time was measured on a hot plate kept at 150° C. (hereinafter, this gel time is referred to as "hot plate gel time"), which was found to be 43 seconds. Further, 18 parts by weight of hexamethylenetetramine, 65 parts by weight of woodflour, 25 parts by weight of calcium carbonate and 3 parts by weight of stearic acid were added to 100 parts by weight of this resin and the mixture was kneaded on hot rolls at 100° for 5 minutes to obtain a molding material. This material was formed into a molded article, which had a Barcol hardness of 52. When a high-para novolac phenol resin produced with a usual acid catalyst (Comparative Example 4) was used, the Barcol hardness was as low as 25 for the same formulation.

EXAMPLE 2

To reaction under reflux were subjected 282 g of phenol and 160 g of 45% by weight formalin (F/P=0.80) for 3 hours in the presence of 3.0 g of manganese acetate (the consumption of phenol was 40% by weight and the consumption of formaldehyde was 81% by weight). Then, 0.1 g of 30% by weight hydrochloric acid was added (pH 1.1), after which the mixture was dehydrated under reduced pressure for 30 minutes (water content 1%). Thereafter, the temperature was stepwise raised from 105° C. to 150° C. in 3 hours to obtain 285 g of a resin having a free phenol content of 6.0% by weight, an o/p ratio of 1.1 and a number average molecular weight of the resin exclusive of free phenol of 750. This resin had a hot plate gel time of 51 seconds. In the case of usual high-para novolac phenol resin, the gel time is about 91 seconds. Further, the curability, i.e. maximum degree of cure and curing rate, of the same sample as used in the measurement of gel time was measured by means of Curelastometer (a trade name of Japan Synthetic Rubber). The results were as shown in Table 1. The resin obtained in the present Example is superior to high-para novolac phenol resin (Comparative Example 4) in both maximum degree of cure and curing rate, demonstrating its quick-curing property.

COMPARATIVE EXAMPLE 1

In the same manner as in Example 2, 282 g of phenol and 195 g of 37% by weight formalin (F/P=0.80) were subjected to reaction in the presence of 2.8 g of zinc chloride without adding hydrochloric acid and then taken out onto a vat. Thus, 240 g of a resin having a free phenol content of 6.2% by weight, an o/p ratio of 0.9, a number average molecular weight of the resin exclusive of free phenol of 650 and a hot plate gel time of 63 seconds was obtained. As compared with the products of Example 1 and Example 2, this resin was lower in not only o/p ratio and molecular weight but also yield.

EXAMPLE 3

A mixture of 282 g of phenol and 81.8 g of 88% by weight paraformaldehyde (F/P=0.80) was slowly heated from room temperature to 100° C. in 30 minutes and then from 100° C. to 150° C. in one hour in the presence of 1.6 g of zinc chloride and 0.66 g of zinc acetate. Thereafter, the mixture was kept at a reduced pressure of 80 mm Hg and then taken out onto a vat. Thus, 289 g of a resin having a free phenol content of 7.6% by weight, and o/p ratio of 1.5, a number average molecular weight of the resin exclusive of free phenol of 850 and a hot plate gel time of 37 seconds was obtained. As measured with Curelastometer, the curability of the resin was as shown in Table 1. Further, a molding material was prepared therefrom in the same manner as in Example 1, and the Barcol hardness of a molded article of the molding material was measured to be found 57.

EXAMPLE 4

To reaction under reflux were subjected 282 g of phenol and 187 g of 37% by weight formalin (F/P=0.77) for 3 hours in the presence of 3.3 g of zinc acetate (consumption of phenol, 60% by weight; consumption of formaldehyde, 90% by weight), after which 4.1 g of salicylic acid was added thereto (pH 3.5). After dehydration under reduced pressure (water content, 2% by weight), the mixture was slowly heated from 100° C. to 150° C. in 3 hours, to obtain 288 g of a resin having a free phenol content of 5.8% by weight, an o/p ratio of 1.8, a number average molecular weight of the resin exclusive of free phenol of 800 and a hot plate gel time of 28 seconds. As measured with Curelastometer, the curability of the resin was as shown in Table 1. A molding material was prepared therefrom in the same manner as in Example 1 and formed into a molded article. The insulation resistance of the molded article was $3.1 \times 10^{10}$ Ω in the normal state and $5.7 \times 10^9$ Ω after being boiled.

COMPARATIVE EXAMPLE 2

To reaction under reflux were subjected 282 g of phenol and 190 g of 37% by weight formalin for 2 hours in the presence of 1.6 g of zinc acetate (consumption of phenol, 50% by weight; o/p ratio, 2.5). The mixture was heated for an additional 2 hours (consumption of phenol, 80% by weight; o/p ratio, 1.6). Then, 1.5 g of oxalic acid was added (pH 2.1), and the resulting mixture was heated under reflux for 2 hours. Thereafter, the mixture was dehydrated and concentrated under normal pressure and then heated to 150° C. in 3.5 hours, to obtain 285 g of a resin having a free phenol content of 7.0% by weight, an o/p ratio of 0.9, a number average molecular weight of the resin exclusive of free phenol of 820 and a hot plate gel time of 51 seconds. These results demonstrate that the o/p ratio drops when the reaction is effected at a temperature of not more than 100° C. even in the presence of a divalent metal salt and that the o/p ratio drops when the temperature of condensation is not more than 100° C.

As compared with the resin of Example 3 and Example 4, this resin was lower in o/p ratio and inferior in quick-curing property. Moreover, it necessitated a reaction time of more than 2 hours longer than that in Example 1, Example 2, Example 3 and Example 4.

EXAMPLE 5

In the same manner as in Example 1, 286 g of a resin was prepared by reacting 282 g of phenol and 79 g of 88% by weight paraformaldehyde (F/P=0.77) in the presence of 0.8 g of manganese nitrate and 1.9 g of zinc acetate. This resin had a free phenol content of 6.0% by weight, an o/p ratio of 2.0, a number average molecular weight of the resin exclusive of free phenol of 900 and a hot plate gel time of 23 seconds. A molding material was prepared therefrom in the same manner as in Example 1, and formed into a molded article. It had a Barcol hardness of 60.

EXAMPLE 6

To reaction under reflux were subjected 282 g of phenol and 195 g of 37% by weight formalin (F/P=0.80) for 3.5 hours in the presence of 1.5 g of manganese acetate (consumption of phenol, 50% by weight; consumption of formaldehyde, 93% by weight). After adding 1.0 g of benzoic acid (pH 5.0), the mixture was immediately concentrated under reduced pressure (water content, 3% by weight). Then, the mixture was stepwise heated to 150° C. in 3 hours, to obtain 292 g of a resin having a free phenol content of 8.0% by weight, an o/p ratio of 2.5 and a number average molecular weight of the resin exclusive of free phenol of 900. As measured with Curelastometer, the curability of this resin was as shown in Table 1.

COMPARATIVE EXAMPLE 3

To reaction under reflux were subjected 282 g of phenol and 160 g of 45% by weight formalin for 3 hours in the presence of 3.0 g of manganese acetate and 0.1 g of 30% by weight hydrochloric acid. Then, the mixture was subjected to dehydration under reduced pressure and dehydration in the same manner as in Example 2, and taken out onto a vat. The resin thus obtained was a high-para phenol novolac resin. Although in the present Example the F/P, the catalysts, and the amount of catalysts were the same as in Example 2, no high-ortho resin was obtained because the divalent metal salt was added at once at the start of reaction.

COMPARATIVE EXAMPLE 4

To reaction under reflux were subjected 282 g of phenol and 195 g of 37% by weight formalin for 3 hours in the presence of 3 g of oxalic acid, after which the mixture was dehydrated under normal pressure and heated to 150° C. in 4 hours. The resin thus obtained was a high-para phenol novolac resin having a free phenol content of 7% by weight, an o/p ratio of 0.75 and a number average molecular weight of the resin exclusive of free phenol of 850. The curability of this resin was measured with Curelastometer in the same manner as in Example 2. The results were as shown in Table 1, which demonstrate that the curing reaction of this resin is much slower than that of the resins obtained in the Examples.

COMPARATIVE EXAMPLE 5

In the same manner as in Example 2, 282 g of phenol and 170 g of 37% by weight formalin (F/P=0.70) were reacted in the presence of 3.3 g of zinc acetate without adding hydrochloric acid. When the inner temperature reached 145° C., a violent reaction took place and a gel was formed.

TABLE 1

|  | Curability measured with Curelastometer | | | | |
|---|---|---|---|---|---|
|  | Example 2 | Example 3 | Example 4 | Example 6 | Comparative Example 4 |
| Maximum degree of cure (kg) | 9.0 | 8.7 | 8.5 | 7.5 | 6.2 |
| Curing rate (kg/min) | 3.8 | 5.2 | 5.8 | 8.1 | 2.1 |

What is claimed is:

1. A process for producing a quick-curing phenolic resin having an ortho linkage/para linkage ratio of 0.9–3.0 and a number average molecular weight of the resin exclusive of free phenol of 600–1,100, which comprises reacting one mole of phenol with 0.6–0.95 mole of formaldehyde under reflux using at least one salt of an organic carboxylic acid with an alkaline earth metal or a transition metal selected from the first and second transition elements having atomic numbers of 21–30 and 39–48 in the Periodic table as a catalyst, then adding an acid to adjust the pH value to 1–5, immediately thereafter removing water under reduced pressure and further subjecting the product to reaction under normal pressure at a temperature of more than 100° C.

2. A process according to claim 1, wherein the amount of the catalyst is 0.1–3% by weight based on the weight of the phenol charged.

3. A process according to claim 2, wherein the formaldehyde is used in the form of formalin.

4. A process according to claim 2, wherein the consumption of formaldehyde is 50–59% by weight and the consumption of phenol is 30–75% by weight when the reflux is completed.

5. A process according to claim 2, wherein the dehydration under reduced pressure after the addition of the acid is effected until the water content in the reaction system becomes not more than 5% by weight.

6. A process according to claim 4 or 5, wherein the formaldehyde is used in the form of formalin.

* * * * *